(12) United States Patent
Sipola

(10) Patent No.: US 7,636,301 B2
(45) Date of Patent: Dec. 22, 2009

(54) DISTRIBUTED TRANSMITTING APPARATUS AND METHOD WITH RETRANSMISSION FUNCTION

(75) Inventor: Jussi Sipola, Jääli (FI)

(73) Assignee: Nokia Corporation, Espoo (FI)

( * ) Notice: Subject to any disclaimer, the term of this patent is extended or adjusted under 35 U.S.C. 154(b) by 1119 days.

(21) Appl. No.: 10/134,311

(22) Filed: Apr. 26, 2002

(65) Prior Publication Data

US 2002/0159408 A1 Oct. 31, 2002

Related U.S. Application Data

(63) Continuation of application No. PCT/EP99/08498, filed on Nov. 5, 1999.

(51) Int. Cl.
*H04L 31/08* (2006.01)
(52) U.S. Cl. .............. 370/225; 370/235; 370/348; 370/465; 714/748; 455/67.11
(58) Field of Classification Search .............. 370/225, 370/231, 348, 235, 465; 714/18, 748–751; 709/223, 229; 455/67.11, 509
See application file for complete search history.

(56) References Cited

U.S. PATENT DOCUMENTS 5,694,454 A * 12/1997 Hill et al. ............... 455/403
6,163,861 A * 12/2000 Yoshioka et al. ........... 714/712
6,359,877 B1 * 3/2002 Rathonyi et al. ........... 370/349
6,408,003 B1 * 6/2002 Rezaiifar et al. ........... 370/394
6,473,399 B1 * 10/2002 Johansson et al. .......... 370/229

FOREIGN PATENT DOCUMENTS

| EP | 0825738 | 2/1998 |
| JP | 5-167565 | 7/1993 |
| JP | H08-251658 | 9/1996 |
| WO | 9857509 | 12/1998 |

OTHER PUBLICATIONS

Patent Abstracts of Japan for JP 05167565 (1 page).
English Translation of the Cited Portion of Reference No. 1 (JP 5-167565) (2 pages).

* cited by examiner

*Primary Examiner*—Ian N Moore

(57) ABSTRACT

A distributed transmitting apparatus and a method are provided in a communications system in which retransmission of data frames can be requested by a receiver. According to the method, a transmitting unit in the distributed transmitting apparatus transmits data frames to a receiver and stores the transmitted data frames. The apparatus further includes a control unit which transmits the data frames to the transmitting unit for transmission to the receiver, and further the control unit transmits control data to the transmitting unit for controlling retransmission of the data frames, wherein the control unit controls the transmitting unit to retransmit data frames stored in the transmitting unit to the receiver.

8 Claims, 2 Drawing Sheets

DISTRIBUTED TRANSMITTING APPARATUS AND METHOD WITH RETRANSMISSION FUNCTION

CROSS-REFERENCE TO RELATED APPLICATION

This application is a continuation of International Application PCT/EP99/08498 having an international filing date of Nov. 5, 1999 and from which priority is claimed under all applicable sections of Title 35 of the United States Code including, but not limited to, Sections 120, 363 and 365(c).

FIELD OF THE INVENTION

The present invention relates to a distributed transmitting apparatus and method in a communications system in which retransmission of data frames can be requested.

BACKGROUND OF THE INVENTION

In communications where retransmission(s) can be requested when a data frame is received erroneously, an Automatic Repeat reQuest (ARQ) protocol for controlling the retransmission(s) may be used.

In a communications system employing the ARQ protocol, a transmitter transmits data frames to a receiver and receives acknowledgment frames from the receiver. In the following, the communications channel between the transmitter and the receiver is referred to as primary link.

The transmitter is divided in two parts: a Protocol Control Unit (PCU) and a Channel Coding Unit (CCU). The PCU contains an implementation of the ARQ protocol used over the primary link. The CCU includes lower layer functions such as channel coding and modulation for the primary link. The services of the CCU are used by the PCU. The PCU and the CCU may be placed in different locations. In the following, the communications channel between the PCU and the CCU is referred to as the secondary link.

This kind of situation may for example exist in a cellular GPRS (General Packet Radio Service) network in the communication between a Mobile Station (MS) and a Base Transceiver Station (BTS) which is controlled by a Base Station Controller (BSC) as it is shown in FIG. 1. The functions of the CCU which is a Channel Codec Unit according to GPRS are included in the BTS and the functions of the PCU which is a Packet Control Unit according to GPRS are included in the BSC. Alternatively, in some implementations the PCU is not located in the BSC, but may be located in the BTS or the GSN (GPRS support node). In the following, it is assumed that the PCU is located in the BSC.

The ARQ protocol is used in a radio interface which forms the primary link between the mobile station MS and the GPRS network via the BTS and BSC. The secondary link is formed by an Abis interface between the BSC and the BTS.

According to a conventional communications method using ARQ, the PCU stores all the data frames transmitted from the GPRS network until they are no longer needed. The exact time when transmitted data frames are no longer needed depends on the acknowledgment frames received from the mobile station MS for the transmitted data frames and on the ARQ protocol used.

When a data frame is to be transmitted, the PCU sends it to the CCU through the Abis interface, and the CCU transmits the data frame to the mobile station MS through the radio interface. Retransmissions have to be done in exactly the same way. Thus, the same data frame may have to be sent over the Abis interface multiple times, thereby consuming communications recources.

SUMMARY OF THE INVENTION

It is therefore an object of the present invention to improve retransmission of data frames in a distributed transmitting apparatus which is a transmitting apparatus comprising separate CCU and PCU units.

According to an aspect of the present invention, this object is achieved by a distributed transmitting apparatus in a communications system in which retransmission of data frames can be requested by a receiver MS, the apparatus comprising:
 a transmitting unit CCU for transmitting data frames to a receiver MS and for storing the transmitted data frames; and
 a control unit PCU for transmitting data frames to the transmitting unit CCU for transmission to the receiver MS, and for transmitting control data to the transmitting unit CCU for controlling retransmission of data frames,
  wherein the control unit PCU controls the transmitting unit CCU to retransmit data frames stored in the transmitting unit CCU to the receiver MS.

According to another aspect of the present invention, the above-mentioned object is achieved by a transmitting method in a distributed transmitting apparatus in a communications system in which retransmission of data frames can be requested by a receiver MS, the method comprising the steps of:
 transmitting data frames from a control unit PCU to a transmitting unit CCU for transmission to a receiver MS;
 transmitting data frames from the transmitting unit CCU to the receiver MS;
 storing the transmitted data frames in the transmitting unit CCU;
 transmitting control data from the control unit PCU to the transmitting unit CCU for controlling retransmission of data frames,
 wherein the transmitting unit CCU is controlled by the control unit PCU to retransmit data frames stored in the transmitting unit CCU to the receiver MS.

Moreover, the above-mentioned object is achieved by a transmitting unit CCU in a distributed transmitting apparatus in a communications system in which retransmission of data frames can be requested by a receiver MS, the distributed transmitting apparatus comprising the transmitting unit CCU and a control unit PCU, wherein the transmitting unit CCU receives data frames from the control unit PCU for transmission to a receiver MS, transmits data frames to the receiver MS and stores the transmitted data frames; and wherein the transmitting unit CCU receives control data from the control unit PCU for controlling retransmission of data frames, and retransmits data frames stored to the receiver MS upon retransmission commands from the control unit PCU.

Furthermore, the object is achieved by a control unit PCU in a distributed transmitting apparatus in a communications system in which retransmission of data frames can be requested by a receiver MS, the distributed transmitting apparatus comprising the control unit PCU and a transmitting unit CCU, wherein the control unit PCU transmits data frames to the transmitting unit CCU for transmission to a receiver MS, and transmits control data to the transmitting unit CCU for controlling retransmission of data frames; and wherein the control unit PCU controls the transmitting unit CCU to retransmit data frames stored in the transmitting unit CCU to the receiver MS.

In case the receiver MS has not correctly received a data frame, the control unit PCU receives a retransmission request from the transmitting unit CCU, which retransmission request is sent to the transmission unit CCU by the receiver MS.

According to an embodiment of the present invention, the control unit PCU adds an identification number to each data frame which is transmitted from the control unit PCU to the transmitting unit CCU and commands a retransmission of a data frame using the identification number. That is, the control unit PCU controls retransmission by transmitting the identification number of the previously transmitted requested data frame to the transmitting unit CCU so as to cause the transmitting unit CCU to retransmit the requested data frame which has been stored in the transmitting unit CCU at the time of first transmission.

Alternatively, the control unit PCU defines a numbering sequence for the data frames transmitted from the control unit PCU to the transmitting unit CCU and commands a retransmission of a data frame on the basis of the numbering sequence. To be precise, numbers of data frames are not transmitted, but they are based for example on counters provided in both the control unit PCU and the transmitting unit CCU. Each counter is incremented when a data frame is transmitted from the control unit PCU to the transmitting unit CCU. Retransmission is controlled by transmitting the number of the requested data frame or the difference between the current value of the counter in the control unit PCU and the number of the requested data frame from the control unit PCU to the transmitting unit CCU, so as to cause the transmitting unit CCU to retransmit the requested data frame to the receiver MS.

Moreover, according to the present invention, the control unit is placed remotely to the transmitting unit.

The present invention is applicable to different ARQ protocols used in communications where retransmission(s) are requested by a receiver when a data frame is received erroneously. For example, the present invention can be applied to a stop-and-wait ARQ protocol, go-back-N ARQ protocol, selective-reject ARQ protocol and hybrid ARQ protocol.

In the present invention, the transmitted packets are stored in a memory of the transmitting unit CCU instead of a memory of the control unit PCU. Therefore, the PCU does not need to transmit the packets to the CCU each time a retransmission is needed, but rather commands the CCU to transmit the packet from the memory of the CCU to the receiver. Hence, the PCU still remains in full control of the ARQ protocol.

An advantage of the present invention is that the need for communication between the PCU and the CCU is reduced, i.e. the capacity of the secondary link is not wasted on retransmissions. In the case of the cellular network shown in FIG. 1, the required Abis capacity is reduced.

Moreover, the present invention is advantageous in EGPRS (Enhanced General Packet Radio Service) where the use of the IR (Incremental Redundancy) mode causes a high number of retransmissions and where the amount of data in each frame is large.

In the following the present invention will be described by way of preferred embodiments thereof with reference to the accompanying drawings.

DESCRIPTION OF THE PREFERRED EMBODIMENTS

Figure 1:
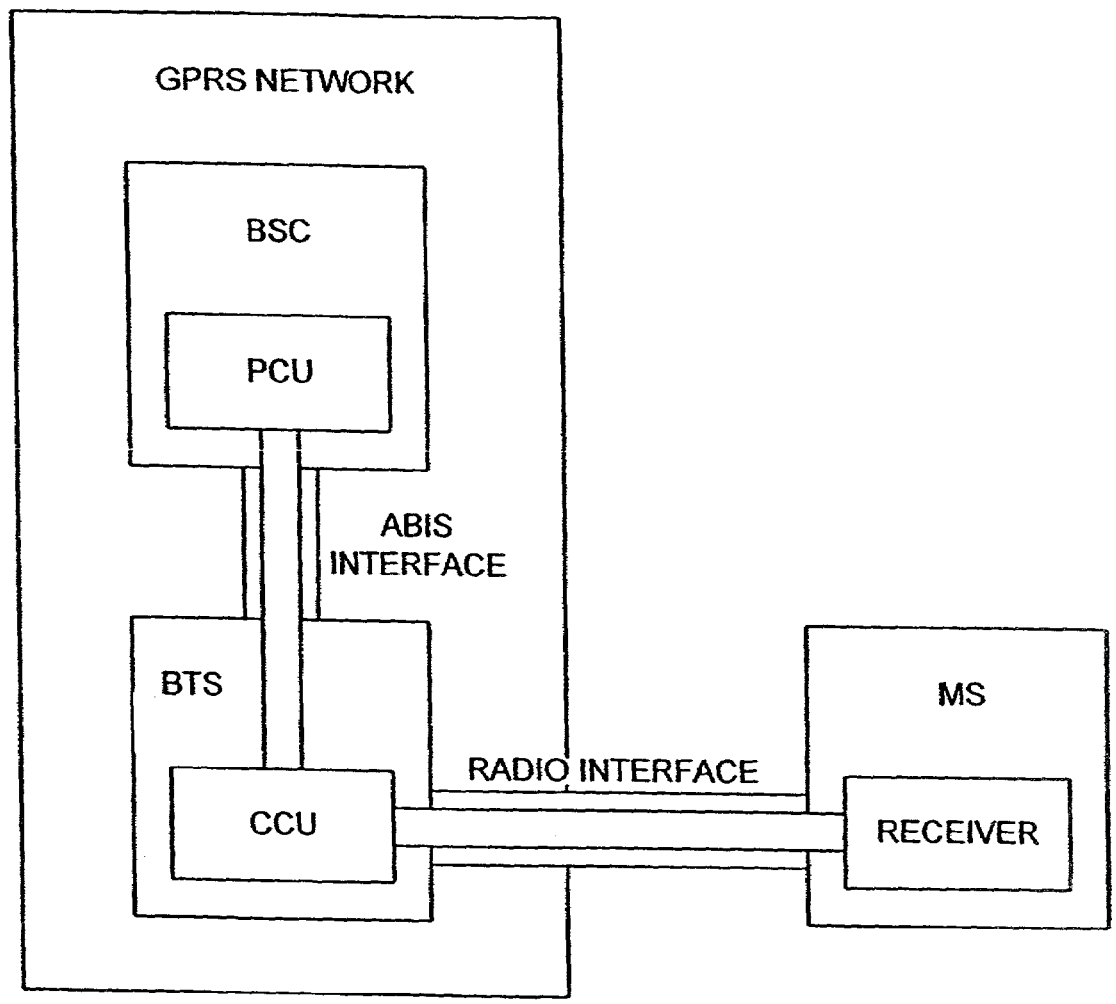
FIG. 1 shows a schematic block diagram of components of a cellular communications network, which are relevant for the present invention.

In the GPRS network as shown in FIG. 1, the Packet Control Unit PCU is located in the Base Station Controller BSC and the Channel Codec Unit CCU is located in the Base Transceiver Station BTS, forming a distributed transmitter. The PCU communicates with the CCU via the Abis interface.

The transmission of data frames from the GPRS network to the mobile station MS according to the present invention will be described in the following with reference to FIG. 2.

It is to be noted that in the description of the present invention, the unit of transmission is called a frame. However, the term frame should be understood to include also the meaning of the words packet and block.

Figure 2:
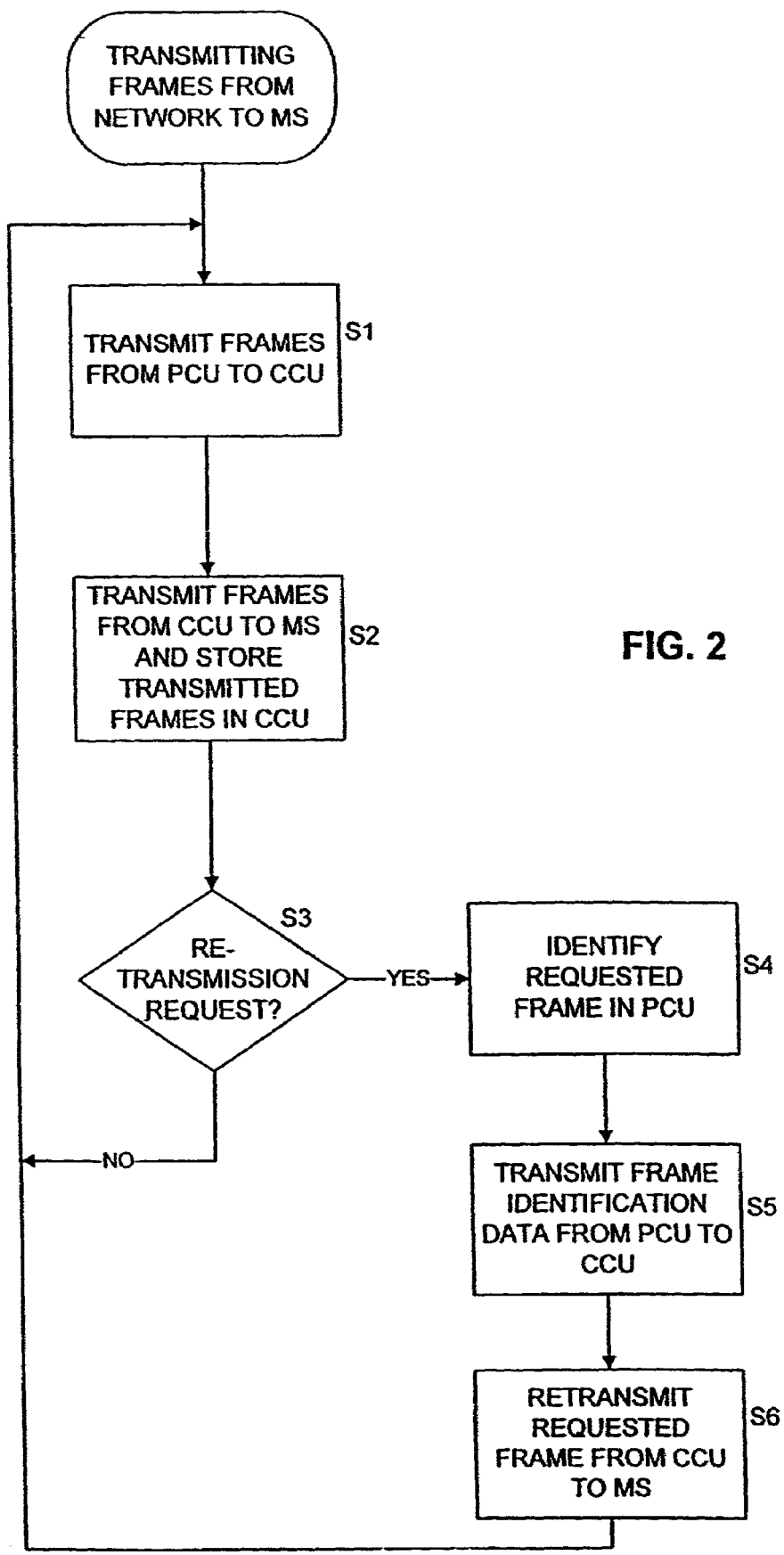
FIG. 2 shows a flowchart of a retransmission method according to the present invention.

When a data frame is to be transmitted for the first time from the network to the MS, the PCU sends it to the CCU for transmission (see step S1 of FIG. 2). Then, the CCU transmits the data frame to the MS via the radio interface and stores the data frame in a memory provided in the CCU (step S2).

It should be noted that each of the steps shown in FIG. 2 are to be viewed as representing corresponding means for carrying out the illustrated step. Therefore, the step S1 also represents means in the PCU for transmitting frames to the CCU and the step S2 also represents means in the CCU for both receiving the frames transmitted in step S1 by the PCU, means for transmitting such frames received from the PCU to the MS and means for storing such frames.

There is means (S3) in the CCU for receiving and determining the presence of a retransmission request from the MS and for transmitting that request to the PCU, corresponding to the step S3. The PCU likewise has means for receiving (from the CCU) and means for determining the presence of such a retransmission request. The PCU has means to identify the requested frame and means for transmitting the frame identification data from the PCU to the CCU. The CCU has means for retransmitting the requested frame from the CCU to the MS.

In case of a retransmission requested by the MS from the PCU via the BTS according to the ARQ protocol used, the PCU identifies the data frame whose retransmission has been requested (step S4). After having identified the requested data frame, the PCU does not resend the entire frame via the Abis interface, but only a signaling element that can be used by the CCU to identify the requested data frame (step S5). The CCU then locates the requested data frame in its memory and transmits it via the primary link to the MS (step S6). The PCU remains in full control of the ARQ protocol.

Next, it will be described how the PCU signals the CCU which frame is to be retransmitted.

According to an embodiment of the present invention, the PCU adds an identification number to each frame transmitted from the PCU to the CCU. When a retransmission is requested by the MS, the PCU sends the identification number of the previously transmitted requested data frame to the CCU. The CCU identifies the requested data frame in its memory using the identification number and retransmits the data frame to the MS.

According to another embodiment of the present invention, the PCU defines a numbering sequence for the data frames sent to the CCU for transmission. The numbers are not transmitted to the CCU, but are based for example on counters in both the PCU and the CCU. Each counter is incremented when a data frame is sent from the PCU to the CCU via the Abis interface. In case a retransmission is requested by the MS, the PCU sends the number of the requested data frame or the difference between the current value of the counters and the number of the requested data frame to the CCU. The CCU identifies the requested data frame in its memory on the basis of the number sent from the PCU and retransmits the requested data frame to the MS.

The CCU stores the transmitted data frames until the PCU instructs the CCU to erase them. The time of erasure depends on the acknowledgment frames received by the PCU from the MS and the ARQ protocol used.

Moreover, according to an alternative way of erasing the data frames in the CCU, the data frames are kept in the CCU for a certain period of time or, alternatively, the number of frames in the CCU memory is fixed and old frames are replaced by new frames. In either way, no frame erasure signaling is needed between the PCU and the CCU because the PCU is able to calculate whether a certain frame is still in the CCU memory. If the PCU determines that a frame is not in the memory, then it will fall back into the conventional method, i.e. the PCU will retransmit the entire frame.

The present invention also is useful in EGPRS, especially in case the PCU is placed remote to the BTS. In EGPRS, the use of the IR (Incremental Redundancy) mode causes a high number of retransmissions and the amount of data in each frame is large. In applying the present invention, the need for communicating entire data frames from the PCU to the CCU or BTS is reduced and the Abis interface capacity can be saved, for example for other users.

While the invention has been described with reference to preferred embodiments, the description is illustrative of the invention and is not to be construed as limiting the invention. Various modifications and applications may occur to those skilled in the art without departing from the true spirit and scope of the invention as defined by the appended claims.

The invention claimed is:

1. A system, comprising:
a transmitter configured to perform lower layer functions for a primary link between the system and a receiver; and
a controller configured to perform an automatic repeat request protocol used over the primary link,
wherein the controller is placed remotely to the transmitter and is configured to transmit digital data frames via a secondary link to the transmitter for transmission to the receiver, when the transmission is a first transmission of the digital data frames from the system to the receiver,
wherein the transmitter is configured to transmit the digital data frames to the receiver via the primary link and store the digital data frames transmitted to the receiver in a memory of the transmitter at least temporarily,
wherein if the receiver requests a retransmission of a digital data frame that is not received correctly, according to the automatic repeat request protocol, the controller is configured to determine if the requested digital data frame is still stored in the memory of the transmitter,
if the requested digital data frame is still stored in the memory of the transmitter, the controller is configured to transmit only a control signal to the transmitter, and the transmitter is configured to identify the digital data frame among the digital data frames stored in the memory according to the control signal and retransmit the requested digital data frame to the receiver, and
if the requested digital data frame is not stored in the memory of the transmitter anymore, the controller is configured to retransmit the requested digital data frame to the transmitter and the transmitter is configured to retransmit the requested digital data frame to the receiver.

2. The system according to claim 1, wherein if the receiver has not correctly received the digital data frame out of the digital data frames transmitted from the transmitter, a retransmission request is sent to the transmitter by the receiver, the transmitter is configured to send the retransmission request to the controller, and the controller is configured to receive the retransmission request from the transmitter.

3. The system according to claim 2, wherein the controller is configured to add an identification number to each of the digital data frames transmitted from the controller to the transmitter and wherein the control signal to the transmitter for re-transmitting the requested digital data frame comprises information of the identification number of the requested digital data frame and the transmitter is configured to identify and retransmit the requested digital data frame to the receiver out of the digital data frames stored in the memory using the identification number.

4. The system according to claim 2, wherein the controller is configured to define a numbering sequence for the digital data frames transmitted from said controller to said transmitter and wherein the control signal to the transmitter for re-transmitting the requested digital data frame comprises information of the requested digital data frame in relation to the numbering sequence and the transmitter is configured to identify and retransmit the requested digital data frame out of the digital data frames stored in the memory on the basis of the numbering sequence.

5. A method, comprising:
transmitting digital data frames from a controller of a system via a secondary link to a transmitter of the system for transmission to a receiver via a primary link between the system and the receiver, when the transmission is a first transmission of the digital data frames
from the system to the receiver, wherein the controller is placed remotely to the transmitter, the transmitter performs lower layer functions for the primary link between the system and the receiver, and the controller performs an automatic repeat request protocol used over the primary link;
transmitting the digital data frames to the receiver via the primary link;
storing the transmitted digital data frames in a memory of the transmitter at least temporarily;
if the receiver requests a retransmission of a digital data frame that is not received correctly, according to the automatic repeat request protocol, determining if the requested digital data frame is still stored in the transmitter,
if the requested digital data frame is still stored in the memory of the transmitter, transmitting only a control signal from the controller to the transmitter, identifying the requested digital data frame among the data frames stored in the memory of the transmitter according to the control signal, and re-transmitting the requested digital data frame from the transmitter to the receiver;
if the requested digital data frame is not stored in the memory of the transmitter anymore, re-transmitting the requested digital data frame from the controller to the transmitter, and re-transmitting the requested digital data frame from the transmitter to the receiver.

6. The method according to claim 5, wherein if the receiver has not correctly received the digital data frame out of the digital data frames transmitted from the transmitter, the receiver is configured to send a retransmission request to the transmitter, and wherein the method further comprises:

transmitting the retransmission request from the transmitter to the controller.

7. The method according to claim 6, further comprising:

adding an identification number to each of the digital data frames transmitted from the controller to the transmitter;

wherein the control signal to the transmitter for re-transmitting the requested digital data frame comprises information of the identification number of the requested digital data frame, and identifying the requested digital data frame among the data frames stored in the memory comprises identifying the requested digital data frame among the digital data frames stored in the memory using the identification number.

8. The method according to claim 6, further comprising:

defining a numbering sequence for the digital data frames transmitted from the controller to the transmitter; and wherein the control signal to the transmitter for re-transmitting the requested digital data frame comprises information of the requested digital data frame in relation to the numbering sequence, and identifying the requested digital data frame among the data frames stored in the memory comprises identifying the requested digital data frame among the digital data frames stored in the memory on the basis of the numbering sequence.

* * * * *

UNITED STATES PATENT AND TRADEMARK OFFICE
CERTIFICATE OF CORRECTION

PATENT NO. : 7,636,301 B2 Page 1 of 1
APPLICATION NO. : 10/134311
DATED : December 22, 2009
INVENTOR(S) : Jussi Sipola It is certified that error appears in the above-identified patent and that said Letters Patent is hereby corrected as shown below:

On the title page, item [56], insert the following patents under "FOREIGN PATENT DOCUMENTS"

--JP    H11-262054    9/1999
  WO    99/17469    4/1999--

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO.        : 7,636,301 B2                                                  Page 1 of 1
APPLICATION NO. : 10/134311
DATED             : December 22, 2009
INVENTOR(S)       : Jussi Sipola It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1333 days.

Signed and Sealed this

Ninth Day of November, 2010

David J. Kappos
*Director of the United States Patent and Trademark Office*